United States Patent [19]
Leyssens et al.

[11] Patent Number: 5,687,266
[45] Date of Patent: Nov. 11, 1997

[54] OPTICAL INTERCONNECTION UNIT FOR INTERCONNECTING OPTICAL

[75] Inventors: Francois Jeanne Charles Leyssens, Mortsel; Peter Vetter, Antwerp; Geert De Pestel, Nevele; Frédéric Migom, Kortrijk, all of Belgium

[73] Assignee: Alcatel N.V., Rijswijk, Netherlands

[21] Appl. No.: 515,262

[22] Filed: Aug. 15, 1995

[30] Foreign Application Priority Data

Aug. 16, 1994 [EP] European Pat. Off. ............ 94202332.6

[51] Int. Cl.$^6$ ...................................................... G02B 6/38
[52] U.S. Cl. .............................. 385/59; 385/71; 385/135
[58] Field of Search ............................... 385/53, 59, 63, 385/71, 54, 89, 92, 56, 134, 135, 136, 139, 147

[56] References Cited

U.S. PATENT DOCUMENTS

| | | | |
|---|---|---|---|
| 4,863,232 | 9/1989 | Kwa | 385/89 |
| 4,981,336 | 1/1991 | Mohan | 385/56 |
| 5,204,925 | 4/1993 | Bonnani et al. | 385/59 |
| 5,259,051 | 11/1993 | Burack et al. | 385/76 |
| 5,309,537 | 5/1994 | Chun et al. | 385/59 |
| 5,513,293 | 4/1996 | Holland et al. | 385/135 |

FOREIGN PATENT DOCUMENTS

| | | |
|---|---|---|
| 0 157 485 | 10/1985 | European Pat. Off. . |
| 0 511 779 | 11/1992 | European Pat. Off. . |

OTHER PUBLICATIONS

Patent Abstracts of Japan, vol. 10, No. 3 (p. 418), 8 Jan. 1986, and JP-A-60 159 812 (Nippon Mektron) 21 Aug. 1995.

Patent Abstracts of Japan, vol. 11, No. 324 (p. 628) 22 Oct. 1987, and JP-A-62 108 212 (Furakawa Electric) 19 May 1987.

*Primary Examiner*—Rodney B. Bovernick
*Assistant Examiner*—Hemang Sanghaui
*Attorney, Agent, or Firm*—Frishauf, Holtz, Goodman, Langer & Chick

[57] ABSTRACT

An interconnection unit OB includes a flat member FM with connectors OC1, and flexible tongue-shaped elements T formed to be integral with the flat member FM. Conductors F each have a first end part fixed to one of the tongue-shaped elements T and a second end part fixed to the flat member. The tongue-shaped elements T and the flat member FM are formed of a layer of rigid material and each of the tongue-shaped elements T has a portion thereof that includes separated transverse strips S, which are kept together by the conductors F fixed to the tongue-shaped elements, thereby making the tongue-shape elements flexible. A stainless steel plate is fixed to the rigid layer. The interconnection unit is especially useful as an optical backpanel to interconnect optical connectors of printed boards mounted in a rack.

3 Claims, 2 Drawing Sheets

OPTICAL INTERCONNECTION UNIT FOR INTERCONNECTING OPTICAL

BACKGROUND OF THE INVENTION

1. Field of the Invention

The present invention relates to an interconnection unit comprising a flat member with conductors fixed thereto.

2. Description of the Prior Art

Such a unit is already known in the art, e.g. from the published European Patent Application 511 779 A2. Therein, the unit is an optical backpanel including a flat member with arcuate grooves of different depths in which optical fiber conductors are fixed. It is used to interconnect, by means of the conductors, optical terminals of printed circuit boards. Therefor the optical backpanel is mounted transverse to a parallel array of the printed circuit boards. The grooves are of different depths to adapt the location of the conductors to that of the optical connectors. Thus, the structure of the interconnection unit, and more specifically the depth of the grooves, depends on the location of the optical conductors, and a specific interconnection unit is dedicated to a specific array of printed circuit board. As a result the known interconnection units can not be manufactured in mass quantity. Moreover, an interconnection unit of the known type is complex due to the larger number of grooves of different depths.

SUMMARY OF THE INVENTION

An object of the present invention is to provide an interconnection unit of the known type but which does not have the above mentioned drawbacks, i.e. which is less complex and which can be manufactured in mass quantities without having to take into account the structure of an assembly it is intended to be used with.

According to the invention, this object is achieved by providing said interconnection unit additionally with flexible tongue-shaped elements and connectors provided on said flat member, each of said conductors having a first end part fixed to one of said tongue-shaped elements and a second end part fixed to said flat member.

Indeed, when this interconnection unit is used in a similar way as in the above prior art, i.e. as backpanel, the terminals on the boards can easily be reached because of the flexible structure of the tongue-shaped elements and thus the location of these terminals has not to be taken into account when manufacturing the interconnection unit. Moreover, the structure of the interconnection unit according to the invention is less complex than that of the known one since there is no need for grooves of different depths.

Another characteristic feature of the invention is that said tongue-shaped elements are integral with said flat member, said elements and said member being made of a layer of rigid material, each of said tongue-shaped elements having a portion where said layer is transversally cut in strips, said strips being kept together by the conductor fixed thereto, thereby making said tongue-shaped elements flexible.

In this way flexible tongue-shaped elements are obtained from a rigid material. As a result, and since the flat member is made of the same rigid material, the fiber conductors can be applied mechanically.

Still another feature of the invention is that a stainless steel plate having the form of said tongue-shaped elements and of said flat member is fixed to a surface of said layer of rigid material, said conductors being fixed to another surface thereof.

Applying a steel plate to the rigid layer improves the protection of the conductor. This is especially advantageous for optical conductors.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION

Figure 1:
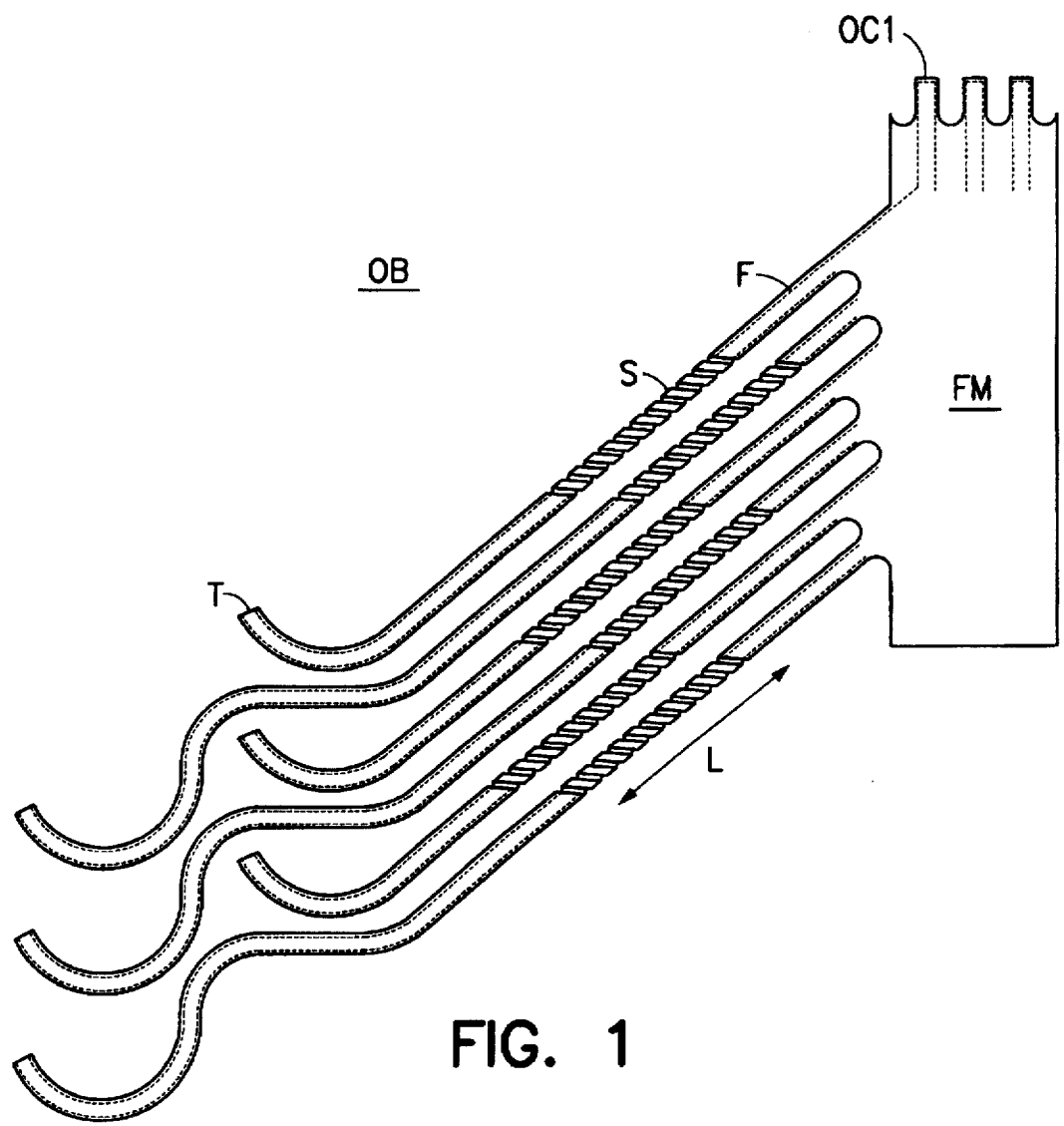
FIG. 1 shows an optical interconnection unit OB according to the invention.

The interconnection unit OB of FIG. 1 includes a flat rectangular member FM provided with optical connectors OC1 at one of its smaller sides, and with lateral oblique tongue-shaped elements T integral with the flat member FM and located at one of the longer sides thereof. Both the tongue-shaped elements and the flat member are made of a layered material (not shown) constituted by a thin stainless steel sheet glued to a rigid plate of insulation material.

Optical fiber conductors F are fixed to the rigid plate of both the tongue-shaped elements T and the flat member FM, e.g. by means of a glue, and are connected to predetermined ones of the optical connectors OC1. The way in which it is determined to which connectors the fibers have to be connected will be explained later.

The fiber conductors are represented by dashed lines which, for the sake of clarity, are not completely shown on the flat member FM. Indeed, there only the end portions of the fiber conductors are shown.

It is to be noted, that although in the present embodiment only a single fiber conductor is fixed to each tongue-shaped element, also a set of fiber conductors could be fixed to each such element.

A portion L of the rigid plate of each of the tongue-shaped elements T is made of separated parallel strips S which are however kept together by both the fiber conductor attached to it and by the thin stainless steel plate. In this way, the tongue-shaped elements become relatively flexible and the fiber conductors, and more specifically the portions of the conductors fixed to the strips, are protected by the stainless steel plate.

In case the elements have to be flexible in a limited way, e.g. in only one direction, the strips do not have to be parallel. Also, if there is no need for additional protection of the conductor, the steel plate may be omitted.

It is to be noted that the interconnection unit could also be manufactured of co called flexprint material to make the tongue-shaped elements flexible. However, it would then be more difficult to apply the fiber conductors mechanically.

Figure 2:
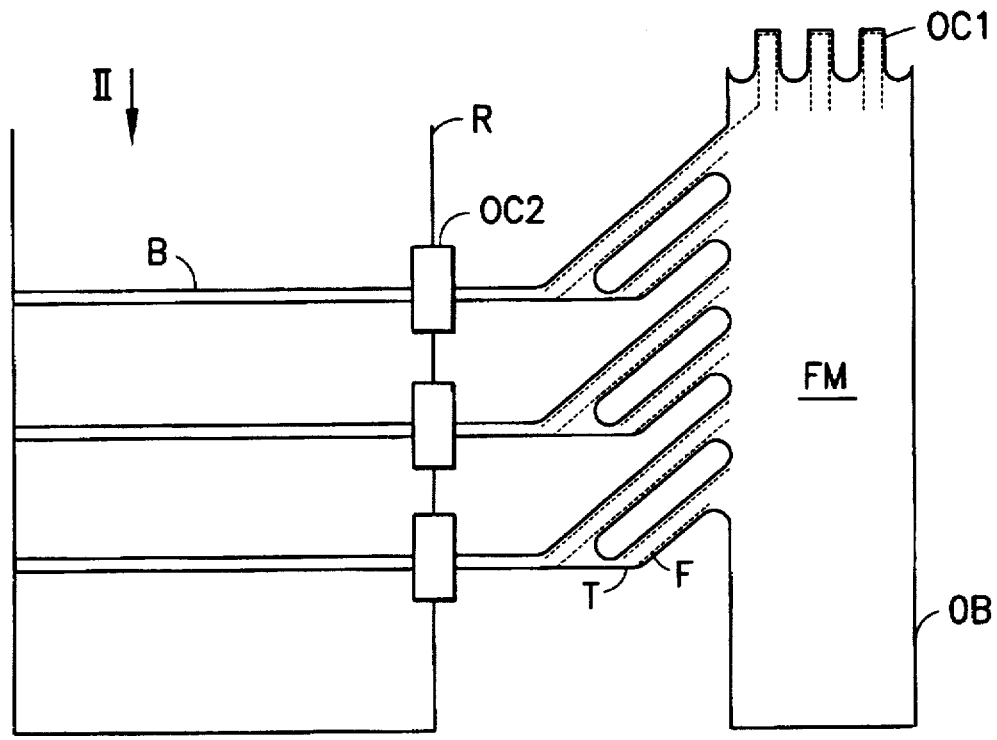
FIG. 2 is a top view of an optical interconnection unit as in FIG. 1 used in cooperation with printed circuit boards mounted in a rack.
Figure 3:
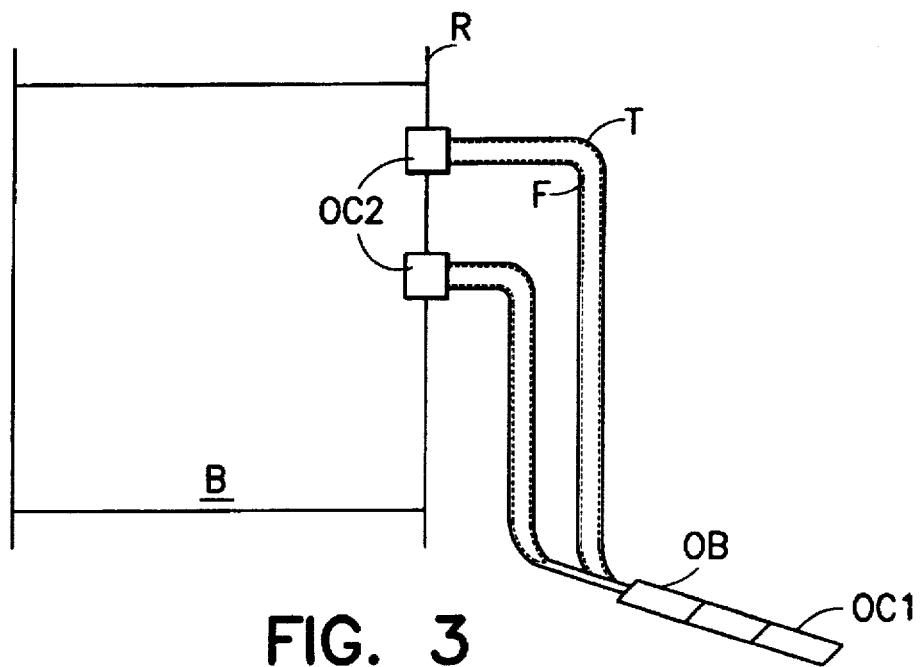
FIG. 3 is a side view of FIG. 2 taken in the direction of arrow III.

FIGS. 2 and 3 show an application of the interconnecting unit as an optical backpanel interconnecting optical connectors OC2 of printed circuit boards B mounted in a rack R.

First end parts of the optical conductors F fixed on the tongue-shaped elements are connected to predetermined ones of the connectors OC2, whilst second end parts fixed on the flat member are connected to predetermined ones of the connectors OC1. In this way the boards can either be interconnected or be connected to external sources or sinks via OC1.

It is to be noted that to facilitate the interconnections between OC1 and OC2 an additional set of connectors similar to OC1 can be realized at the other smaller side of FM.

While the principles of the invention have been described above in connection with specific apparatus, it is to be clearly understood that this description is made only by way of example and not as a limitation on the scope of the invention.

I claim:

1. An optical interconnection unit, comprising:
    a flexible one piece flat member (FM), said one piece flat member including:
        a plurality of tongue-shaped elements (T) formed to be integral with the flat member; and
        a optical plurality of connectors (OC1);
        each of said plurality of tongue-shaped elements comprises a portion having a plurality of separated strips (S) which are positioned to be in a direction transverse to a plane in which said flat member (FM) is positioned;
    a plurality of optical conductors (F) fixed to said flat member,
    each of said plurality of optical conductors (F) having a first end portion thereof fixed to respective different ones of said plurality of tongue-shaped elements and having a second end portion thereof fixed to said flat member (FM);

wherein:

said plurality of tongue-shaped elements (T) and said flat member (FM) each comprise a layer of rigid material; and said plurality of separated strips (S) being kept together by the optical conductors fixed to the respective different ones of the plurality of tongue-shaped elements to thereby provide flexibility to the tongue-shaped elements.

2. The interconnection unit according to claim 1, wherein said plurality of separated strips (S) are parallel to each other.

3. The interconnection unit according to claim 1, wherein a stainless steel plate having a form of said tongue-shaped elements and of said flat member is fixed to a surface of said layer of rigid material, said conductors (F) being fixed to another surface of said rigid material.

* * * * *

UNITED STATES PATENT AND TRADEMARK OFFICE
CERTIFICATE OF CORRECTION

PATENT NO. : 5,687,266
DATED : November 11, 1997
INVENTOR(S) : LEYSSENS et al.

It is certified that error appears in the above-identified patent and that said Letters Patent is hereby corrected as shown below:

On the title page, item [54] and column 1, line 2, after

"INTERCONNECTING OPTICAL", insert --TERMINALS--.

Column 3, line 20 (claim 1, line 6),

"a optical plurality of connectors" should read

--a plurality of optical connectors--.

Signed and Sealed this

Sixteenth Day of March, 1999

Attest:

Q. TODD DICKINSON

Attesting Officer

Acting Commissioner of Patents and Trademarks